United States Patent Office 2,944,685
Patented July 12, 1960

2,944,685

MOTOR CONVEYOR AND STRIPPER

John J. Nicolazzi, 1221 Ocean Parkway, Brooklyn, N.Y.

Filed Feb. 19, 1959, Ser. No. 794,459

2 Claims. (Cl. 214—6)

The present invention relates to equipment for handling lithographic plates and other plates of similar nature.

The invention is particularly directed to stripping, conveying and unloading apparatus for receiving lithographic plates from the wicket of an oven, conveying the plates to an unloader and stacking the plates on a removable platform for further transportation.

It is an object of the invention to provide improved apparatus which is of simple yet strong and durable construction and is substantially free from maintenance expense over a long period of time.

The characteristics, objects and advantages of the invention will appear more fully from the following description and claims in conjunction with the accompanying drawings which show a preferred embodiment of the invention and in which:

Figure 1B:
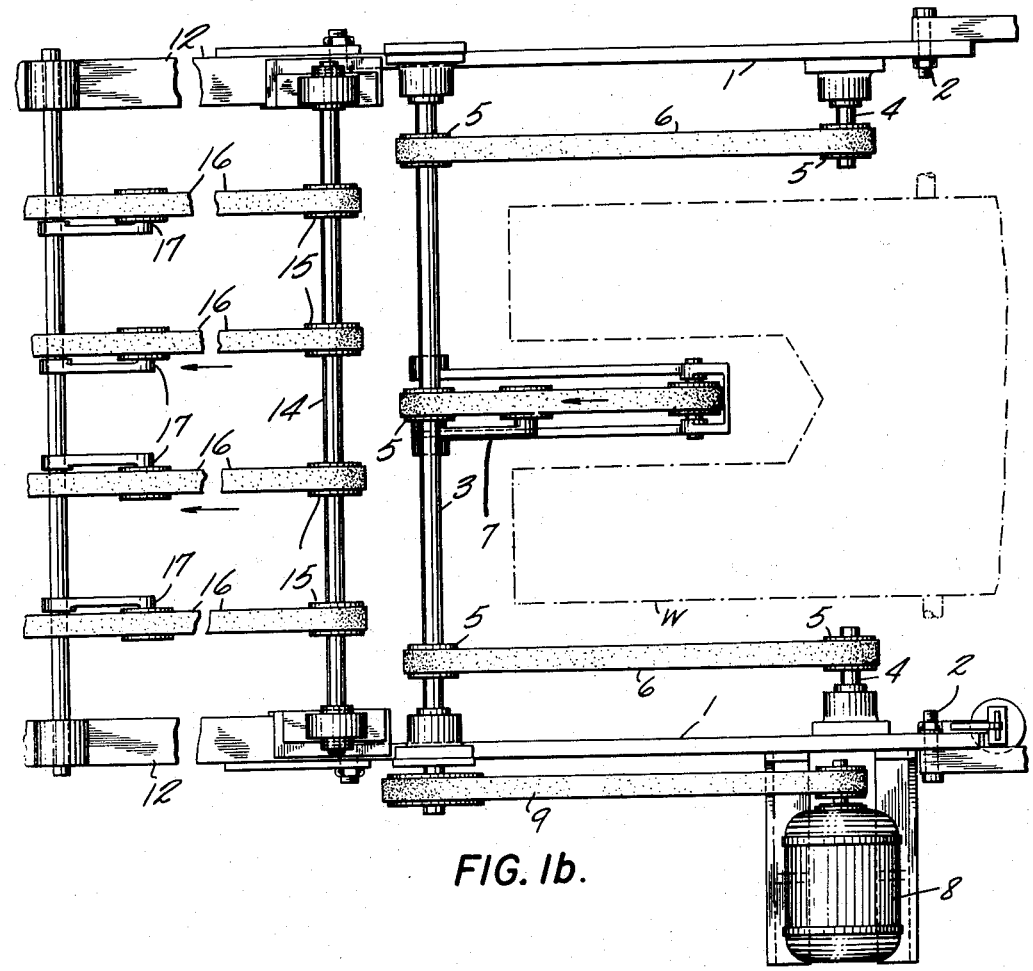

As illustrated in the drawings, the apparatus consists of a stripper, a conveyor and an unloader. The stripper which is located at the right hand side (Figs. 1b and 2b) takes lithographic plates from the wicket W of an oven. It comprises a frame 1 which is pivoted at 2 to swing about a horizontal transverse axis. The frame 1 carries a belt conveyor consisting of a transverse drive shaft 3, stub shafts 4, pulleys 5 carried by the shafts and belts 6 running on the pulleys. The conveyor is shown as comprising three equally spaced parallel belts of which the central belt is shorter and extends into a central cut-out portion of the wicket W. The belts 6 are preferably formed of flat strips of belt material having opposite ends pinned or otherwise releasably secured together so that the belts are removable and replaceable without disassembling the equipment. The belts of the conveyor are maintained under proper tension by suitable idler pulleys carried on arms projecting radially from a shaft which is located below and parallel to the drive shaft 3, one such idler pulley together with its supporting arm being shown by way of example at 7. The idler pulleys engage the lower runs of each belt. The conveyor is driven by an electric motor 8 which is mounted on the frame 1 and drives the drive shaft 3 through a belt 9.

Figure 1A:
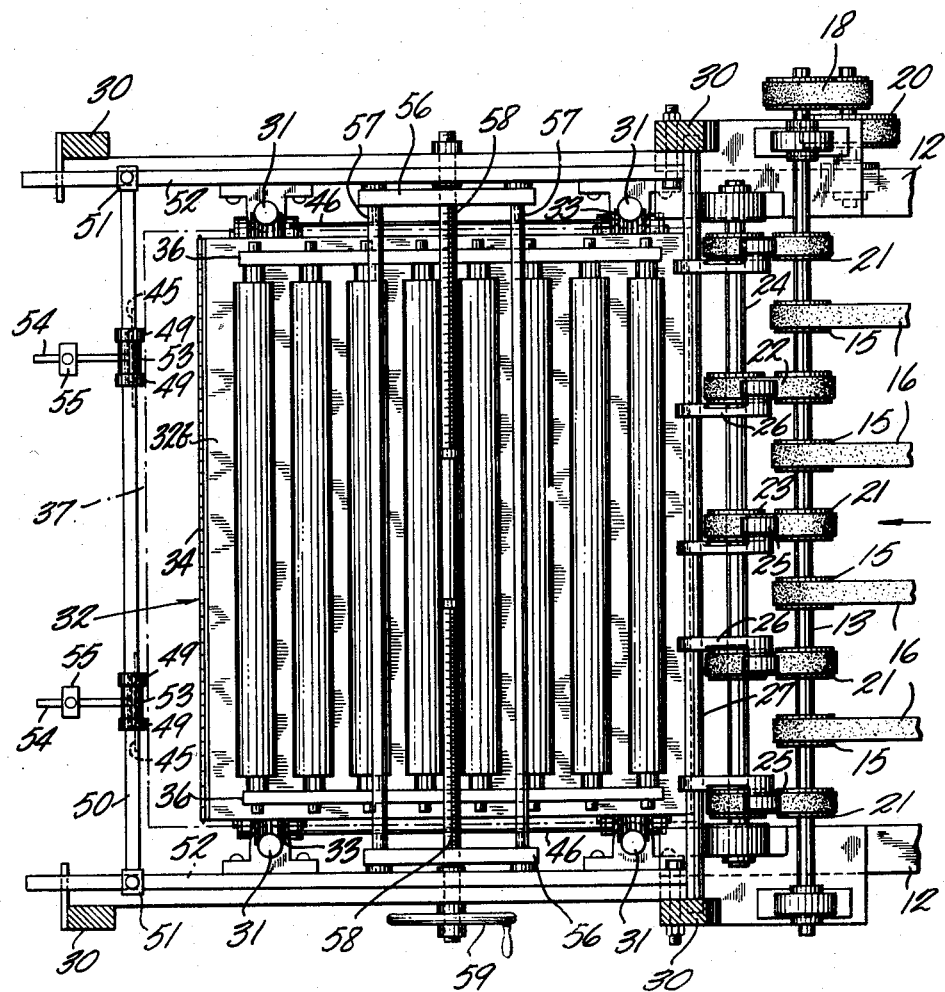
Figs. 1a and 1b are together a plan of the apparatus.
Figure 2A:
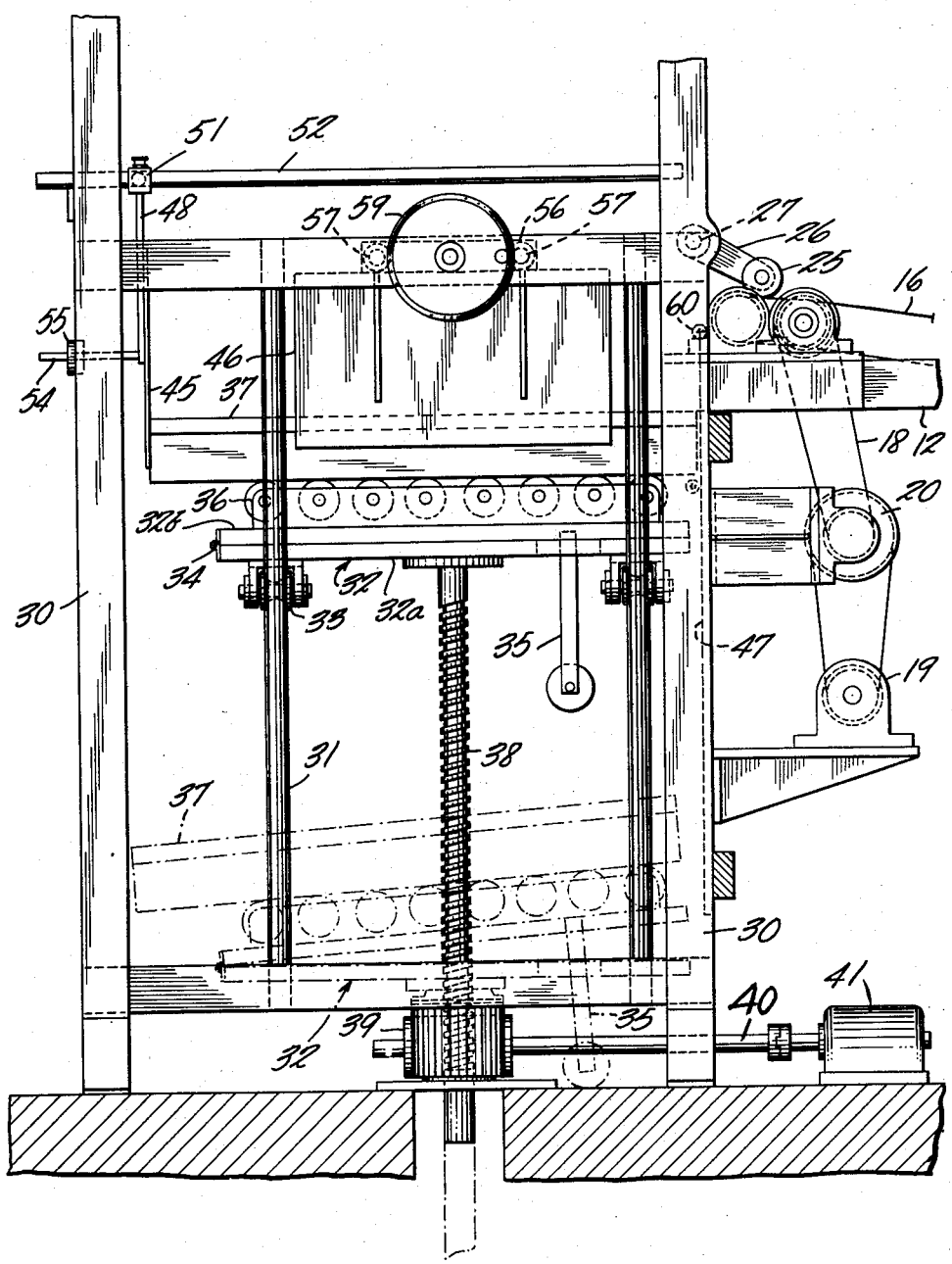
Figs. 2a and 2b are together a side elevation.
Figure 2B:
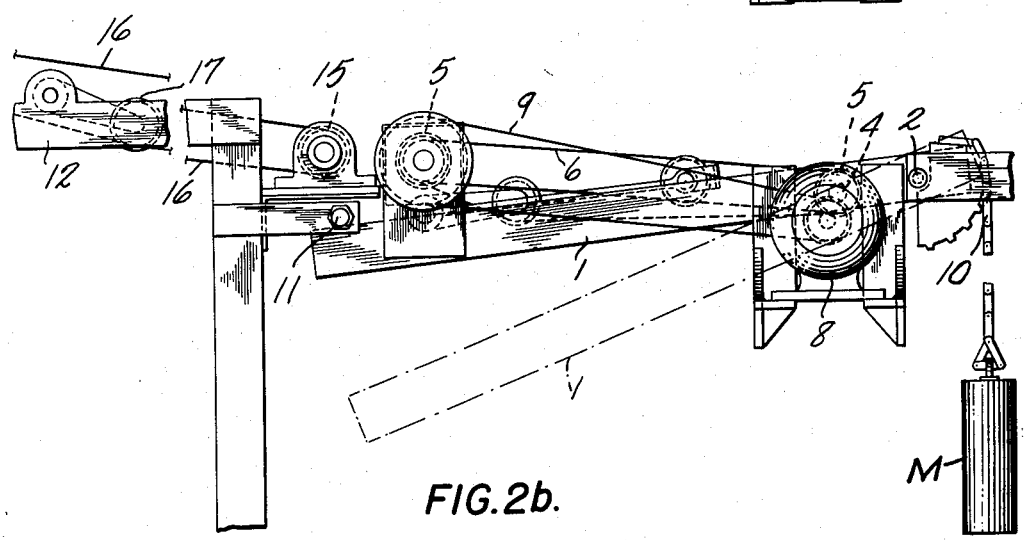

The entire frame 1 together with the belt conveyor carried by the frame is swingable about the pivots 2 from the normal operating position as shown in solid lines in Fig. 2b to an inclined position as shown in broken lines. The frame 1 is counterbalanced by means of weights M suspended from chains 10 at each side of the frame. Stop pins 11 limit the upward movement of the stripper frame. In normal operation, the counterweights M hold the stripper frame up against the stop pins 11. The wicket W is intended to deliver one plate at a time to the stripper. If through malfunctioning the wicket delivers two or more plates at once the additional weight of the plates causes the stripper to swing downwardly about its pivots so that the excess plates are discharged from the stripper which then swings back to its normal operating position.

The conveyor for transporting the plates from the stripper to the unloader has a frame structure 12 rotatably supporting shafts 13 and 14 carrying pulleys 15 on which conveyor belts 16 run. The conveyor is shown as comprising four parallel belts which are offset laterally from the belts 6 of the stripper. Each of the belts 16 preferably comprises a strip of belt material having its opposite ends secured together by a pin or other releasable fastening means so that the belts can be removed and replaced readily. The belts 16 are kept tight by means of idler pulleys 17 which engage the lower runs of the belt and are carried by arms projecting from a shaft extending transversely of the frame of the machine parallel to the pulley shafts 13 and 14. The conveyor shaft 13 is driven by a belt 18 from an electric motor 19 through speed reducing pulleys 20. In addition to the pulleys 15 for belts 16, the shaft 13 also carries pulleys 21 for short conveyor belts 22 running over pulleys 23 on a shaft 24. As illustrated in the drawing, there are five short conveyor belts 22 which are offset laterally from the belts 16. Above the short belts 22 there are provided holddown rollers 25 which are carried by arms 26 on a transverse shaft 27. The rollers 25 engage the upper faces of the plates as they are discharged from the end of the conveyor so that the plates remain substantially horizontal as they are discharged. The arms 26 carrying the rollers 25 are adjustable so that the angle of discharge of the plates can be regulated.

The unloader has a frame 30 made up of flat bar stock comprising four vertical bars at the four corners of the frame and horizontal bars connecting the vertical bars. There are also four vertical round bars 31 which are secured to opposite horizontal members of the frame and provide tracks for a vertically movable carriage 32 having rollers 33 that run on the tracks 31. The elevator carriage 32 is shown as having a baseplate 32a and an upper plate 32b which are connected together at their rear edges by a hinge 34 so that the upper plate 32b is tiltable relative to the carriage. Legs 35 project downwardly from the upper plate 32b and extend through holes in the lower plate 32a. A roller conveyor 36 is mounted on the upper plate 32b and is adapted to support a platform 37 which is for example of the kind used with fork-lift trucks. The upper plate 32b can, if desired, be omitted in which event the frame of the conveyor 36 is hinged to the base plate 32a and the legs 35 would be secured to and extend down from the frame of the conveyor 36. The elevator carriage 32 is supported by a central jack shaft 38 which is illustrated as being the shaft of a screw jack 39 driven by a shaft 40 from a motor 41. It will be understood that instead of the screw jack a hydraulic or other jack may be used. The elevator carriage 32 is movable vertically from an upper position as shown in solid lines to a lower position as shown in broken lines.

The plates discharged from the conveyor into the unloader dropped down onto the platform 37 which in its uppermost position is a short distance below the level of the discharge end of the conveyor. The plates are guided by rear guides or stops 45, side guides 46 and a front plate 47. The apparatus is illustrated as having two front stops 45, each consisting of a metal plate covered with a heavy rubber sheet to take the impact of the plates as they are discharged from the conveyor. Each of the stops 45 is supported by two bars 48 suspended from collars 49 which are rotatable on a shaft 50 extending transversely of the machine. At its ends the shaft 50 is provided with sleeves 51 that slide on bars 52 extending in a fore and aft direction at the sides of the machine. The shaft 50 carrying the stop plates 45 is thus adjustable in a forward and rearward direction for use with different size plates. It is held in adjusted position by thumb screws in the sleeves 51 that engage the bars 52. The collars 49 from which the stop plates 45 are suspended by bars 48 are positioned in correct location longitudinally of the shaft 50 by a sleeve or collar 53 which is pinned or otherwise secured to the shaft 50. The fixed sleeves 53 are preferably provided with stops or abutments so that the plates 45 can be swung in a clockwise direction a little more than 180° from the downward position shown so as to have them out of the way when unloading a platform. Each of the rear stop plates 45 has a shaft 54 projecting rearwardly from it and carrying a counterweight 55. The weight 55 is adjustable along the shaft 54 so as to control the poistion in which the stop plates hang and their resistance to the impact of lithographic plates discharged from the conveyor.

The side plates 46 are carried by cross bars 56 that are slidable on the space shafts 57 extending transversely of the unloader. The two side plates 46 are movable toward and away from one another by means of a right-left screw shaft 58 which extends transversely of the machine parallel to the shafts 57 and is engaged by threaded nut portions on the cross bars 56. The threaded shaft 58 is rotatable by means of a handwheel 59 in order to set the plates 46 in proper position for different sizes of lithographic plates that are being handled. The front plate 47 is stationary.

The motor 41 operating the elevator carriage of the unloader is reversible and is controlled by switch means including a switch 60 mounted on the frame of the unloader and actuated by a roller which is set in position to be engaged by the lithographic plates when they have piled up to a selected height on the platform 37. When the switch 60 is actuated by engagement of the uppermost plate piled on the platform 37 the motor 41 is driven to lower the platform 37 a selected distance. This operation is repeated successively as the plates continue to be stacked on the platform 37. As the elevator 32 approaches the lower limit of its movement, the legs 35 engage the floor or other abutment surface. This causes the roller conveyor 36 to tilt about the hinge 34 so as to be inclined rearwardly as illustrated in broken lines in Fig. 2a. The inclination of the roller conveyor 36 causes the loaded platform 37 to roll off of the elevator onto another conveyor for example a roller conveyor (not shown). The motor 41 is then reversed by a manual switch to raise the elevator. As the elevator is being raised a new platform 37 is shoved onto the elevator by an operator. The downward and upward movement of the elevator is limited by suitable limit switches so that the elevator moves only a predetermined distance.

The machine as thus described is of simple construction with only a minimum number of parts. It is hence economical to build and is operable for long periods of time with minimum maintenance. The stripper, conveyor and unloader is each driven by its own electric motor. There are no friction clutches or other elements that require frequent servicing.

While a preferred embodiment of the invention has been illustrated in the drawings and particularly described, it will be understood that the invention is in no way limited to this embodiment.

What I claim and desire to secure by Letters Patent is:

1. In equipment for handling lithographic plates, apparatus comprising stripper means for stripping plates from an oven wicket, said means including means for discharging excess plates from said oven wickets clear of the apparatus, conveyor means for receiving said plates from said stripper means, and unloader means for receiving and stacking said lithographic plates from said conveyor means, said unloader means comprising a frame, spaced parallel vertically extending tracks positioned by said frame, a double bottom carriage movable vertically on said tracks, the upper of said bottoms being hinged at one edge to the lower bottom, said lower bottom having an orifice opposite said hinged end and said upper bottom having a tilting leg mounted on its lower side and projecting through said orifice in said lower bottom, a roller conveyor mounted on said upper bottom of said carriage, power means for vertically moving said carriage on its tracks, a fixed stop means engageable by said tilting leg when said carriage moves downwardly a selected distance, said leg and stop cooperating to rotate or tilt said upper bottom about its hinged connection with said lower bottom and thereby tilting said roller conveyor mounted on said upper bottom, a platform supported on said roller conveyor, said platform being positioned when said carriage is moved upwardly a selected distance to receive plates from said conveyor means and to accumulate said plates in a vertical stack, control means actuated by said plates to activate said power means to move said carriage downwardly progressively as said plates are accumulated, the engagement of said stop with said tilting leg causing said upper bottom on which said roller conveyor is mounted to rotate about its hinged end and to tilt in a direction to discharge said platform and accumulated plates laterally from said roller conveyor when a selected number of plates have been accumulated.

2. Apparatus as described in claim 1 characterized in that said stripper means comprises supporting means, a belt conveyor system horizontally pivoted at one end to said supporting means, a weight attached to said pivoted end of said system for counterbalancing the weight of said system and a lithographic plate and maintaining said system in approximately horizontal normal operating position, whereby any additional weight of additional lithographic plates causes said system to rotate downward about said pivots to discharge said excess plates and then again counterbalanced to swing upward about said pivots to said normal operating position.

References Cited in the file of this patent

UNITED STATES PATENTS

| | | |
|---|---|---|
| 1,949,964 | Keller et al. | Mar. 6, 1934 |
| 2,058,729 | Sekulski | Oct. 27, 1936 |
| 2,472,225 | Muddiman | June 7, 1949 |
| 2,790,567 | Rockhill | Apr. 30, 1957 |